United States Patent [19]

McGlathery

[11] Patent Number: 4,871,022
[45] Date of Patent: Oct. 3, 1989

[54] METHOD FOR REMOVING POLYMER PLUGGING IN WELL BOREHOLES

[75] Inventor: Mark S. McGlathery, Huntington Beach, Calif.

[73] Assignee: Exxon Chemicals Patents, Inc., Darien, Conn.

[21] Appl. No.: 193,254

[22] Filed: May 11, 1988

[51] Int. Cl.$^4$ .................. E21B 43/22; E21B 43/27
[52] U.S. Cl. .................. 166/300; 166/270; 166/274; 166/305.1; 166/312; 252/8.552
[58] Field of Search .............. 166/270, 273, 274, 300, 166/305.1, 312; 252/8.551, 8.552, 8.553

[56] References Cited

U.S. PATENT DOCUMENTS

| | | | |
|---|---|---|---|
| 1,999,146 | 4/1935 | Ambrose et al. | 166/312 X |
| 3,482,635 | 12/1969 | Pasini, III | 166/305.1 |
| 3,482,636 | 12/1969 | Crowe | 166/312 X |
| 3,556,221 | 1/1971 | Haws et al. | 166/305.1 |
| 3,938,594 | 2/1976 | Rhudy et al. | 166/308 |
| 4,741,401 | 5/1988 | Walles et al. | 166/300 |

*Primary Examiner*—George A. Suchfield
*Attorney, Agent, or Firm*—C. James Bushman; Robert L. Graham

[57] ABSTRACT

A method of removing polymeric material from injection and producing wells in which an aqueous medium containing, chlorine dioxide or sodium chlorite is introduced into the well and maintained in contact with the polymeric material for a period of time sufficient to degrade the polymeric material to a desired degree and allow enhanced injectivity of polymer flooding medium into the injection well or enhanced production from a producing well.

10 Claims, No Drawings

METHOD FOR REMOVING POLYMER PLUGGING IN WELL BOREHOLES

BACKGROUND OF THE INVENTION

1. Field of the Invention

The present invention relates to the treatment of injection and producing oil and gas wells and, more particularly, to the removal of residual polymeric material from such wells.

2. Background of the Description

In the recovery of oil from underground formations, it is often necessary to resort to enhanced recovery techniques since the formation pressure rarely remains sufficient enough to force the oil to flow freely up the primary well bore. One technique commonly employed in enhanced recovery involves polymer flooding. In this technique, other wells, commonly referred to as injection wells, are drilled into the oil bearing formation in generally surrounding relationship to the primary well bore. An aqueous flooding medium containing a polymeric material is then pumped under pressure into the injection wells, the aqueous polymeric medium serving to dislodge the oil in the formation solids and force it towards the primary well bore for recovery.

While polymer flooding is a widely used and successful method of enhanced oil recovery, it is not without its difficulties. As is well known, polymer flooding is accomplished by injecting the aqueous flooding medium containing the dissolved or dispersed polymer into the formation in perforations which extend laterally out from the injection wells. Typically, a desired longitudinal segment of the injection well is chosen as the perforated zone, this zone being effectively packed off from the remainder of the well bore such that the flooding operation can take place without the loss of excessive flooding medium in the injection well.

As the polymer flooding progresses, it is common for solid polymeric material to deposit on the walls of the well bore in the perforated zone and in the interstices of the formation adjacent the perforated zone. Indeed, this polymer deposition will eventually form a plug which markedly interferes with the injection of the polymer flooding medium through the perforations. This necessitates the use of higher and higher pressures in order to inject the aqueous flooding medium and eventually becomes so severe as to prevent further flooding operations.

Polymeric build-up plugging can also occur in the primary well bore i.e. the producing well, in as much as the aqueous medium containing the polymeric material once it passes through the formation, is forced into the producing well. As in the case of the injection wells, the polymeric buildup occurs primarily in the perforated zone of the producing well and in the interstices of the formation immediately surrounding the perforated zone.

In an attempt to remove or at least reduce these polymeric build-ups or plugs, it is known to use oxidants such as hydrogen peroxide, sodium hypochlorite and sodium perborate. The use of hydrogen peroxide or sodium perborate is undesirable because it is relatively expensive. On the other hand, sodium hypochlorite while it is relatively inexpensive, is an inefficient oxidant in degrading the polymeric material.

Canadian Pat. No. 1,207,269 discloses a method of treating oil field produced fluids with chlorine dioxide which acts as a biocide, an emulsion breaker and a hydrogen sulfide scavenger. The Canadian patent teaches that the chlorine dioxide can be injected into the water or other oil field produced brine before or after a first stage separation of the oil from the other fluids and also that in tertiary recovery operations it can be injected before the first stage separation to break emulsions which form in polymer flooding. Chlorine dioxide has also been used in small quantities for wells as a biocide and hydrogen sulfide scavenger.

SUMMARY OF THE INVENTION

It is therefore an object of the present invention to provide an improved method of degrading residual polymeric materials in well boreholes used in the production of oil and gas.

Another object of the present invention is to provide a method for removing polymer plugs from the perforated zone in injection wells used in enhanced oil recovery operations.

The above and other objects of the present invention will become apparent from the description given herein and the appended claims.

In the method of the present invention, an aqueous medium, generally a solution of an oxidant which is chlorine dioxide, sodium chlorite or a mixture thereof is introduced into a well borehole, the aqueous medium being positioned in the borehole in the region where the polymeric material is deposited. The aqueous medium of the oxidant is maintained in contact with the polymeric material for a time sufficient to oxidize or degrade the polymeric material to the desired extent.

DESCRIPTION OF THE PREFERRED EMBODIMENT

In the method of the present invention, the aqueous medium employed is a solution or mixture, preferably a solution, of an oxidant selected from the class consisting of chlorine dioxide, sodium chlorite and mixtures thereof. The oxidant is generally present in the aqueous medium in an amount of at least about 1000 ppm, although depending on the circumstances smaller concentrations may be employed. Although concentration of the oxidant in excess of a saturated solution may be employed, generally concentrations ranging from about 1000 ppm to 3000 ppm, calculated as chlorine dioxide or chlorite are preferred. It will thus be recognized that it is only necessary to have sufficient oxidant in the aqueous medium to degrade or oxidize the polymeric material in the well to the degree desired. The aqueous medium can be prepared by disolving the oxidant, e.g. the sodium chlorite or chlorine dioxide, in fresh water and pumping the thus prepared aqueous medium into the well. Alternately, it is possible, though less desirable, to pump fresh water into the well at the desired location and then introduce the oxidant into the fresh water already in place in the well. As is known, chlorine dioxide is an unstable, highly reactive gas which is soluble in and decomposes in water. Because of its instability, it is common for chlorine dioxide to be generated at the point of use and used immediately. Several methods of on site preparation of chlorine dioxide are described as, for example, in U.S. Pat. Nos. 4,077,879, 4,247,531 and 4,590,057, all of which are incorporated herein by reference.

The method of the present invention is primarily directed to the removal of polymeric material or polymer plugs from injection wells used in enhanced recovery techniques or producing wells which have been subjected to enhanced recovery techniques. In the method of the present invention, the aqueous medium containing the oxidant is pumped down the well and into the area where the polymeric material is deposited. Generally speaking, the polymeric deposits occur in the perforated zone of the well i.e. at the point where lateral holes or perforations are made from the well into the surrounding formation. This perforated zone is generally sealed off from the remainder of the well by means of packers or the like in the well known manner. As noted above, the polymeric material from the polymer flooding mediums tend to cake out or deposit on the walls of the well in the perforated zones, either of the injection well or the producing well. Additionally, the polymeric material can deposit in the pores of the formation adjacent the perforated interval. As these deposits build up, the perforations and surrounding formation can become plugged interferring with further enhanced recovery operations through the injection wells or production from the producing well. Accordingly, by injecting the aqueous medium containing the oxidant into the perforated zone or interval, the oxidant is able to degrade or oxidize the polymer, essentially remove the polymer plug and permit continued enhanced recovery operations or production from the primary well.

Generally, the aqueous medium is pumped in at a rate of from about 0.5 to about 5 barrels per minute, preferably from about 2 to about 3 barrels per minute in the case of producing wells. A sufficient volume of the aqueous medium containing the oxidant is pumped into the well to fill the pore space of a perforated zone from about 3 to about 10 feet radially from the well borehole. It will be recognized, however, that greater or lesser amounts may be employed depending upon the nature and extent of the polymer plugging, the nature of the formation, etc.

In order to ensure removal of the polymeric material in the perforated zone, it is generally necessary that the acqueous medium be pumped, under enough pressure, to ensure that the aqueous medium is forced into the interstices of the polymeric materials/sludge mixture and the formation sufficiently to allow the oxidant to work on the polymeric material. However, excessive pressure must be avoided to ensure that there is no fracturing of the formation. Usually pressures which are about equal to or slightly greater than the formation resistance pressure are employed. The use of sufficient pressure ensures that the formation adjacent the perforated zone is sufficiently water wetted by the aqueous medium thereby enhancing the contact between the oxidant and the polymeric material.

When the aqueous medium containing the oxidant is in place in the well in the perforated zone, it is allowed to stay in contact with the polymeric material until the desired amount of degradation has occurred. The length of time to affect the desired degradation or oxidation of the polymeric material will, of course, depend upon the nature of the polymer, the amount of polymeric material present and other factors. However, in general it has been found that leaving the aqueous medium containing the oxidant in place for a period of time of from about four (4) to about twelve (12) hours is sufficient to degrade the polymeric material to the point where polymer flooding can recommence without the use of unusual pressures for injecting the flooding medium or, in the case of producing wells, production can be started.

The method of the present invention will work effectively on any polymeric material normally used in a polymer flooding operation and which is subject to oxidation or degradation by chlorine dioxide, sodium chlorite or a mixture thereof. Generally speaking, polymeric materials used in polymer flooding mediums are anionic in nature although certain nonionic polymers can be employed. Thus, anionic, generally water soluble polymers such as polyacrylamides, polyacrylates, etc. are subject to degradation by the method of the present invention.

To more fully illustrate the present invention, the following non-limiting examples are presented.

EXAMPLE 1

Eight 2 gram samples of a polymer sludge removed from an injection well bore were placed in 8-oz prescription bottles. Three of the samples were treated with 100 ml each of sodium chlorite solutions containing 1500, 2000, and 2500 ppm of chlorite, respectively. Three of the remaining samples were treated with 100 ml each of chlorine dioxide solutions containing 1500, 2000, and 2500 ppm of chlorine dioxide, respectively. The remaining two samples were used as controls, one being treated with 100 ml of tap water, the other with 100 ml of 15% hydrochloric acid. The sample were allowed to sit 16 hours at which point a check was made to determine how much of the polymer remained in solid form. The results are shown in Table 1 below:

TABLE 1

| Sample | Concentration | Percent of Polymer Remaining |
| --- | --- | --- |
| Sodium Chlorite | 1500 ppm | 25% |
| Sodium Chlorite | 2000 ppm | 25% |
| Sodium Chlorite | 2500 ppm | 25% |
| Chlorine Dioxide | 1500 ppm | 20% |
| Chlorine Dioxide | 2000 ppm | 10% |
| Chlorine Dioxide | 2500 ppm | 10% |
| Water | — | 100% |
| 15% HCl | — | 100% |

As can be seen from the results in Table 1, both sodium chlorite and chlorine dioxide are highly effective at degrading or oxidizing polymer deposits from polymer floods. As can also be seen, water and hydrochloric acid, a chemical commonly used for stimulation in injection wells, had no effect on the polymer.

EXAMPLE 2

A series of test were conducted on actual injection well bores. In all cases, the injection wells had been used for polymer flooding using a polyacrylamide anionic polymer. The aqueous medium employed was saturated with chlorine dioxide, the aqueous medium being prepared by educting chlorine dioxide prepared as per the method taught in U.S. Pat. No. 4,590,057 into fresh water and then pumped into the well. In each case, the amount of the aqueous medium employed amounted to a volume sufficient to displace a five foot radial interval i.e. fill the pore space, across the perforated zone in the well bore. The aqueous medium was pumped into the wells at a pressure of about 3000 psi and at a rate of about 1.5 barrels per minute. After the aqueous medium had been introduced, it was allowed to soak the perforated zone for times ranging from about 4 hours (Case Nos. 4 and 6) to about 12 hours (all remaining cases). Table 2 below shows injectivity of the polymer flooding medium before and after treatment of the injection wells according to the method of the present invention.

TABLE 2

| Case No. | Before BWPD[1] | Injectivity Treatment Pressure (PSI) | After BWPD | Treatment Pressure (PSI) |
|---|---|---|---|---|
| 1 | 65 | 2900 | 290 | 2850 |
| 2 | 305 | 2900 | 520 | 2800 |
| 3 | 295 | 2900 | 1890 | 1270 |
| 4 | 1200 | 2850 | 2310 | 2900 |
| 5 | 400 | 1850 | 3750 | 1600 |
| 6 | 735 | 2900 | 1070 | 2800 |
| 7 | 440 | 2900 | 970 | 2750 |
| 8 | 312 | 1850 | 760 | 1600 |
| 9 | 0 | 1800 | 445 | 1650 |
| 10 | 805 | 2850 | 1320 | 2600 |

[1]Barrels of water per day.

As can be seen from the date in Table 2 above, using the method of the present invention, there is a marked increase in injectivity following treatment of the wells as per the method of the present invention. Not only is the amount of polymer flooding medium which can be injected greatly increased, the pressure at which the injection occurs is reduced, and in some cases, by more than half (Note case 3).

The method of the present invention, as can be seen from the data above, is particularly useful in removing polymer plugs from injection wells. However, it is to be understood that the method of the present invention finds equal applicability in the removal of polymeric material from producing well bores as well. The method of the present invention is vastly superior to prior art methods which employed 5% hydrogen peroxide or 2.5% sodium perborate. Usage costs of those two chemicals is roughly five times the cost for a comparable treatment using chlorine dioxide as per the method of the present invention. Although on a cost basis, sodium hypochlorite is cheaper, sodium hypochlorite is generally unacceptable.

The foregoing disclosure and description of the invention is illustrative and explanatory thereof, and various changes in the method may be made within the scope of the appended claims without departing from the spirit of the invention.

What is claimed is:

1. A method for removing polymeric material from a well borehole penetrating an underground formation comprising:
    (a) introducing into the borehole containing residual material or formation containing residual polymeric material an aqueous medium containing an oxidant selected from the group consisting of chlorine dioxide, sodium chlorite and mixtures thereof, said oxidant being present in an amount sufficient to degrade said polymeric material to a desired degree,
    (b) maintaining said aqueous medium in contact with said polymeric material for a period of time sufficient to effect a desired amount of degradation of said polymeric material, and
    (c) thereafter removing said portion at least of the degraded polymeric material from or away from the borehole or the formation.
2. The method of claim 1 wherein said aqueous solution is maintained in contact with said polymeric material for a period of from about 4 to about 12 hours.
3. The method of claim wherein said oxidant is present in an amount of at least about 1,000 ppm calculated as chlorine dioxide or sodium chlorite.
4. The method of claim 1 wherein said aqueous solution is introduced into said well by pumping at a pressure about equal to formation resistance pressure.
5. The method of claim 1 wherein said aqueous solution is introduced into said borehole in a volume sufficient to fill the pore space of a perforated zone of from about 3 to about 10 feet radially from said borehole and wherein a portion at least of the degraded polymeric material is removed by being displayed radially outwardly into the formation.
6. The method of claim 1 wherein said aqueous solution is introduced into said well at a rate of from about 0.5 to about 5 barrels per minute.
7. The method of claim 6 wherein said rate is from about 2 to about 3 barrels per minute.
8. The method of claim 6 wherein said rate is from about 3 to about 4 barrels per minute.
9. The method of claim 1 wherein said oxidant comprises chlorine dioxide.
10. The method of claim 1 wherein said oxidant comprises sodium chlorite.

* * * * *